Nov. 9, 1948.    J. W. TETER ET AL    2,453,472
DEHYDRATION OF SATURATED NITRILES
Filed Oct. 12, 1944
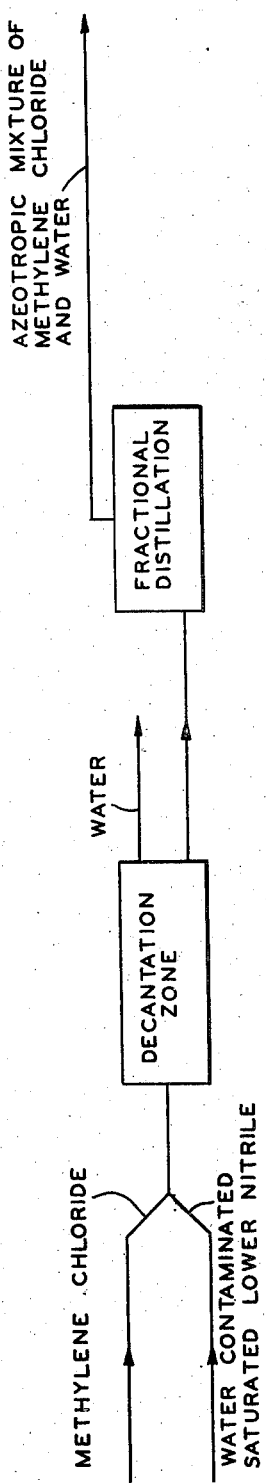
INVENTORS
John W. Teter
Walter J. Merwin
BY
Pennie Edmonds Morton Barrows
ATTORNEYS Patented Nov. 9, 1948

2,453,472

UNITED STATES PATENT OFFICE 2,453,472

DEHYDRATION OF SATURATED NITRILES

John W. Teter and Walter J. Merwin, Chicago, Ill., assignors to Sinclair Refining Company, New York, N. Y., a corporation of Maine Application October 12, 1944, Serial No. 558,475

1 Claim. (Cl. 202—60)

This invention relates to the dehydration of saturated nitriles containing 2 to 4 carbon atoms, that is, acetonitrile, propionitrile and normal and iso butyronitriles, whereby anhydrous or substantially dehydrated products may be obtained by direct fractional distillation of the respective nitriles contaminated by water.

Dehydration of these nitriles has presented a difficult problem because each of them forms a binary azeotrope with water.

We have discovered that if methylene chloride be added to a saturated nitrile containing 2 to 4 carbon atoms the methylene chloride will form an azeotrope with the water present but will not form, to any substantial extent at least, either a binary azeotrope with the nitrile or a ternary azeotrope with the nitrile and water.

Utilizing this peculiarity of methylene chloride in the presence of the lower saturated nitriles and water, the process of the present invention comprises the addition of methylene chloride to the water-contaminated nitrile and subjecting the mixture to close fractional distillation whereby the water is carried off by the methylene chloride leaving behind a substantially anhydrous nitrile.

The invention is also applicable to an operation whereby the entire charge is fractionally distilled and contemplates either batch or continuous operation. The operation may include the distillation of the nitrile, or only the distillation of the water-methylene chloride mixture therefrom.

The optimum proportion of methylene chloride to be added will depend largely upon the amount of water to be removed. It has been found that it requires about 19 lbs. of methylene chloride to carry off, as an azeotrope, 1 lb. of water. However, it does not follow that this quantity of methylene chloride need be added to remove the water from a water-contaminated saturated lower nitrile, because if the nitrile contains relatively large proportions of water, for example, acetonitrile with 16% or more water, addition of the methylene chloride will result in separation of an aqueous layer, which may be separated by decantation or the like and need not be removed by distillation. For complete dehydration of a nitrile, somewhat more than the theoretical proportion of 19 lbs. of methylene chloride to each pound of water to be removed by distillation should be used.

An embodiment of the process of the invention is illustrated in diagrammatic form in the accompanying drawing. In carrying out the embodiment of my invention as illustrated in the drawing the water contaminated saturated lower nitrile to be dehydrated and methylene chloride are supplied to a zone wherein stratification is permitted with resultant formation of an aqueous upper layer and a bottom layer comprising methylene chloride, the nitrile and the remainder of the water. The bottom layer may then be subjected to a close fractional distillation in a fractional distillation zone from which an azeotropic mixture of the methylene chloride and water is removed as an overhead fraction. The fractional distillation operation may be of either the continuous or batch type and therefore the dry nitrile may be removed from the fractional distillation zone either as an overhead product or as a bottoms fraction.

The invention will be further illustrated by the following specific example but it is not limited thereto:

To 66 parts by weight of acetonitrile containing 16% by weight of water was added 409 parts by weight of methylene chloride. The resulting mixture was cloudy, and when permitted to stand, an upper water layer separated. In this way 7.3 parts of an upper water layer were separated, corresponding to almost 70% of the water originally present in the acetonitrile. The bottom layer was subjected to close fractional distillation. The distillation temperature gradually rose from 37° C. at the beginning of the distillation to 38° C. when 71% by volume of the charge had been distilled off. It then rose sharply to 81° C. at something under 80% by volume off and remained constant until 89% of the charge had been distilled off at which point the distillation was discontinued. The fraction distilled off at 81° C. was substantially pure, dry acetonitrile.

The other saturated nitriles having 2 to 4 carbon atoms, namely propionitrile and normal and iso butyronitrile, contaminated with water, may with advantage be dehydrated by the same general procedure without material loss of the nitrile or contamination of the nitrile product by methylene chloride.

We claim:

A process for the dehydration of saturated nitriles of 2 to 4 carbon atoms per molecule which comprises adding methylene chloride to a hydrous nitrile, subjecting the mixture to stratification to separate an aqueous upper layer, and fractionally distilling the water and methylene chloride from the lower layer as a binary azeotrope.

JOHN W. TETER.
WALTER J. MERWIN.

REFERENCES CITED

The following references are of record in the file of this patent:

UNITED STATES PATENTS

| Number | Name | Date |
|---|---|---|
| 2,263,436 | Britton et al. | Nov. 18, 1941 |
| 2,305,106 | Pratt | Dec. 15, 1942 |
| 2,404,163 | Carpenter | July 16, 1946 |